United States Patent [19]

Carlson

[11] Patent Number: 5,080,022

[45] Date of Patent: Jan. 14, 1992

[54] COMPOSITE MATERIAL AND METHOD

[75] Inventor: James P. Carlson, Cypress, Tex.

[73] Assignee: Aerex International Corporation, Houston, Tex.

[21] Appl. No.: 561,351

[22] Filed: Aug. 1, 1990

Related U.S. Application Data

[63] Continuation of Ser. No. 254,429, Oct. 6, 1988, abandoned, which is a continuation-in-part of Ser. No. 113,229, Oct. 23, 1987, abandoned.

[51] Int. Cl.$^5$ .................. C04B 7/02; C04B 7/32
[52] U.S. Cl. .................. 106/698; 106/692; 106/DIG. 1; 106/DIG. 2
[58] Field of Search .......... 106/692, 698, DIG. 1, 106/DIG. 2

[56] References Cited

U.S. PATENT DOCUMENTS

| | | | |
|---|---|---|---|
| 2,585,366 | 2/1952 | Bollaert et al. | 106/698 |
| 2,727,827 | 12/1955 | Chertkof | 106/DIG. 2 |
| 2,858,227 | 10/1958 | Rodsky | 106/698 |
| 3,565,650 | 2/1971 | Cordon | 106/698 |
| 3,847,633 | 11/1974 | Race | 106/DIG. 2 |
| 3,869,295 | 3/1975 | Bowles et al. | 106/90 |
| 4,222,785 | 9/1980 | Henderson | 106/698 |
| 4,362,566 | 10/1982 | Hinterwaldner | 106/661 |
| 4,398,960 | 8/1983 | Murray | 106/816 |
| 4,501,830 | 2/1985 | Miller et al. | 106/679 |
| 4,504,320 | 3/1985 | Rizer et al. | 106/DIG. 1 |
| 4,518,431 | 5/1985 | Duvier | 106/DIG. 2 |

FOREIGN PATENT DOCUMENTS

| | | |
|---|---|---|
| 196602 | 10/1986 | European Pat. Off. |
| 2549585 | 11/1976 | Fed. Rep. of Germany |
| 3150701 | 7/1983 | Fed. Rep. of Germany |

Primary Examiner—Mark L. Bell
Assistant Examiner—Helene Klemanski
Attorney, Agent, or Firm—Arnold, White & Durkee

[57] ABSTRACT

An improved composite material is prepared by first uniformly mixing cement and perlite fines. The perlite fines comprise particles that are less than 200 mesh. The mixture of perlite fines and cement is then mixed with water, formed into a desired shaped, and allowed to dry. The dried material is useful in many applications where cement is used and has fireproofing and strength characteristics superior to ordinary concrete.

30 Claims, 1 Drawing Sheet

10

14

COMPOSITE MATERIAL AND METHOD

This is a continuation of co-pending application Ser. No. 07/254,429 filed on Oct. 6, 1988, now abandoned which is a continuation-in-part of U.S. patent application No. 113,229, filed Oct. 23, 1987, now abandoned.

BACKGROUND OF THE INVENTION

1. Field Of the Invention

The invention relates to an improved composite material and a method for producing the composite material. More particularly, the improved composite material is useful in constructing buildings and other applications where concrete is used, but it is lighter and stronger than concrete.

2. Background of the Prior Art

Concrete is frequently used as a construction material. For example, concrete is cast on structural steel to insulate the structural steel from damage due to a fire. This is necessary because steel quickly loses tensile strength once it reaches temperatures of 1000° F.

For many years, concrete or similar materials such as gunite, which is a mixture of sand and cement, have been used to encase steel as a fireproofing material. A significant disadvantage of concrete as a fire protection material is that concrete weighs between 140 and 165 pounds per cubic foot. This weight increases the load that must be carried by the structural members of a building that uses concrete for fireproofing. In addition, concrete is difficult to install because of the large bulk or mass of concrete required to furnish fire protection.

Concrete is not a good insulator and reacts badly to thermal shock created by the extreme temperatures of a fire. This thermal shock may cause cracks throughout the concrete and spalling where large pieces of the concrete surface fall away from the installation.

Organic materials have been used to furnish fire protection for structural steel. For example, name brands of organic materials used for this purpose include Albi-clad, Chartek, and Thermo-lag. These materials furnish protection through processes known as intumescense, ablation, and sublimation. These organic systems are expensive and typically fail on a high-rise fire test when the temperature of the test sample elevates rapidly, in five minutes, to 2000° F.

Concrete also suffers from the drawback of poor tensile strength when used as a building material. Typical concrete materials have a tensile strength of approximately 300 pounds per square inch (psi) versus a compressive strength of approximately 3000 psi. Consequently, concrete is not generally used alone as a structural material, and instead it must be supplemented by a high tensile strength material such as steel.

The weight disadvantage of ordinary concrete can be reduced by increasing the amount of air entrained within the concrete. However, ASTM C-150 limits the acceptable air content in concrete to a maximum of twenty-two percent.

Known concrete materials have also used perlite as an additive to overcome the disadvantage of concrete concerning its weight. These perlite-added concrete materials are less dense than ordinary concrete with densities ranging from 25 to 85 pounds per cubic foot. The perlite used as an additive in known concrete material consists of either commercially used perlite which has particle sizes greater than 30 mesh on the Tyler Standard Screen Scale or perlite fines which have particle sizes ranging from 8 to 200 mesh.

The commercially used perlite and perlite fines are expanded before they are used as an additive in known concrete materials. The expansion process consists of rapidly heating the perlite particles with the result that they pop like popcorn.

The known perlite-added concrete materials tend to be soft and friable, with a hardness on the shore D scale in the range of 45 to 50. They also have a low compressive strength of 500 to 800 psi, and a low tensile strength of approximately 300 psi.

The strength characteristics of known perlite-added concrete materials have been improved by applying pressure to the wet mix of perlite, cement, and water before it dries into the final product (U.S. Pat. No. 3,565,650). The resulting perlite-added concrete material has a compressive strength of approximately 1200 psi and a tensile strength of approximately 700 psi.

Concrete and concrete derived materials are also used in prefabricated structural and decorative components of buildings. For example, concrete is typically used for face panels in prefabricated buildings because concrete can be cast into panels which have a selected texture. Alternatively, concrete can be treated to leave an exposed aggregate surface.

Since concrete is a heavy material, the structure must be designed to carry the heavy load exerted by the panels. This structural load is handled by upgrading the load bearing capacity of footings and the structural skeleton. This increases the cost of the overall structure since more material is used and additional labor is required.

Because concrete contains a large amount of aggregate, panels cast from concrete are grainy and are difficult to cast with a fine, detailed surface. Moreover, the minimum thickness of concrete panels is generally considered to be three to four inches because the flexural strength of concrete is low. Since concrete panels must be relatively thick, the cumulative weight of the panels is a disadvantage.

While concrete and concrete derived materials can be cast into many different shapes and forms, such as roof tiles, the weight of concrete roof tiles requires greater structural capacity than would a lighter material.

Accordingly, a need exists for an improved composite material which is lighter and stronger than concrete, has better fireproofing capabilities, and can easily be formed into different products. The composition should be inexpensive to manufacture and easy to install.

SUMMARY OF THE INVENTION

The invention teaches an improved composition comprising cement and perlite fines mixed in the range of 30 to 85 percent by weight of cement with the remainder made up of perlite fines. In one embodiment of the invention, the composition comprises cement and perlite powder in a ratio of about one part cement to two parts perlite powder by volume.

Additional components may be added to the improved composition to achieve particular results. For example, components such as an organic filler, fly ash, aggregate, glass fibers, a plasticizer, an air entrainer, and/or a liquid binder can be added to modify the physical properties of the composite material.

Water is mixed with the improved composition to form a castable, moldable mixture that dries into an improved composite material. The improved composite material has fireproofing and strength characteristics superior to ordinary concrete and may be used in its place.

DETAILED DESCRIPTION OF THE INVENTION

Figure 1:
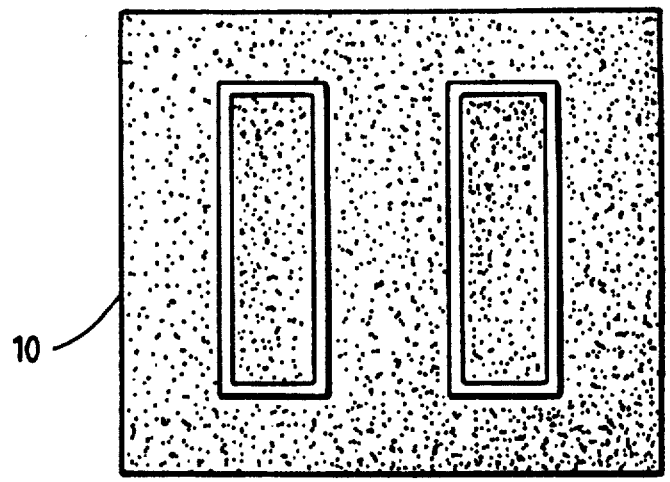
FIG. 1 illustrates a panel formed from the composition of the present invention.

Cement and perlite fines are dry mixed to form a uniform mixture comprising an improved composition. Water is then thoroughly mixed with the improved composition to form a moldable, castable material. This material, when dry, comprises the improved composite material.

Components of the Improved Composition

The invention provides an improved composition comprising the following components:

| Component | Percentage By Weight |
| --- | --- |
| Cement | 30 to 85 |
| Perlite fines | 70 to 15 |
| | 100 |

The cement may be Portland Cement, Calcium Aluminate cement, or any other variety of compound generally known as a cement.

Perlite fines are any extremely fine perlite material. Particularly, perlite fines are perlite material with particle sizes less than 200 mesh. This contrasts with known perlite-added concrete materials that use perlite fines or commercially sold perlite with particle sizes greater than 200 mesh (U.S. Pat. No. 3,565,650).

In the preferred embodiment perlite fines that consist essentially of perlite powder are used.

Perlite powder is generated when perlite ore is exfoliated by being rapidly heated. The rapid heating causes the perlite ore particles to pop like popcorn. This process produces a very fine type of dust material, designated as perlite powder, that is entrained in the hot gases used in the process.

The perlite powder was at one time exhausted into the atmosphere with the hot gases. Enactment of environmental regulations has, however, necessitated that the perlite manufacturing industry eliminate this type of particulate emission. Bag houses, a filtration system for removing entrained particulates from gas streams, are typically used to remove the perlite powder. Commercial perlite manufacturing operations generate large quantities of perlite powder as a waste material from their bag houses.

Experiments conducted on perlite powder to determine particle size distribution have had limited success. The extremely small sizes of the perlite powder particles have defeated efforts to obtain an accurate sieve analysis, because the particles tend to agglomerate and take on a static charge that prevents their passage through standard mesh screens.

A microscope has been used to conduct a particle size analysis on the perlite powder particles and most of the particles were measured in the range of 20–25 microns. This indicates that the majority of perlite powder particles would pass through a 400 mesh screen which corresponds to 37 microns in the Tyler Standard Screen analysis system.

Composition Additives

Other materials and constituents may be added in selected quantities to the compositions of the invention to vary the properties of the resulting improved composite material or to facilitate the method of making the improved composite material.

For example, an amount of aggregate such as sand may be added in amounts of from 4 percent to 8 percent by weight of the above components to facilitate the dry mixing of the cement and perlite fines to form the composition. In this respect, the addition of any material classified as an aggregate can substitute for the sand. In other embodiments, for example, inorganic fillers may be used. In particular, inorganic fly ash may be added in the range of 10 to 16 weight percent of the cement and perlite fines. In such a composition the cement may represent 25–70 weight percent, the perlite fines 8–15 weight percent, and the aggregate, inorganic filler, and other constituents may comprise up to 25 weight percent or more of the material.

Glass fibers or a similar material may be added to provide secondary reinforcing for the improved composite material. In a specific embodiment, one-half inch glass fibers may be added to the composition in the range of 2 percent by weight of the cement and perlite fines.

Other additives can also be added to vary the properties of the composition. For example, resin such as PVA resin can be added to strengthen and provide water resistance to the finished product. In addition, organic plasticizing agents can be mixed with the dry elements in amounts of from 0.2 to about 7 percent by weight thereof to reduce the amount of water required to blend the final composition. An example of a plasticizing agent is Daracem-100 supplied by W. R. Grace.

Additionally, an air entraining agent may be added in an amount of from 0.1 percent by weight up to about 3 percent by weight of the dry elements to reduce the weight of the finished product. An example of an air entraining agent is Airtite, supplied by Gifford Hill. Alternatively, the composite material may comprise, for example, 25–70 weight percent cement, 10–60 weight percent perlite fines, 10–16 weight percent inorganic fly ash, and 4–8 weight percent aggregate.

Preparing the Improved Composition

The composition is prepared by dry mixing the cement and perlite fines according to the desired percentages by weight or volume. This procedure can be performed in any large bin type mixer by tumbling. After the mixing is complete, the composition may be stored in standard size packages or in large quantities.

At this stage, the cement and perlite fines combine to create a unique composition that is used to make the improved composite material. It is believed that after the cement and perlite fines are thoroughly mixed a chemical process occurs which prevents the identification of cement or perlite fines in the resulting improved composite material. It is also believed that the perlite fines retain at least 3 percent water by weight or in any case sufficient moisture to cause the chemical process between the cement and the perlite to occur without the addition of water. The aggregate, inorganic filler, and other composition additives may be mixed with the cement and perlite fines in this dry mixing step.

Analysis of the Improved Composition

In tests, the perlite fines and cement were mixed and the resulting composition was screened to determine a particle size distribution. The results were inconclusive with some particles that were collected on a 4 mesh screen. It appeared that none of the particles of the mixed composition were smaller than 100 mesh based on these tests.

When the composition was examined under a microscope, however, severe agglomeration of the particles was observed. It was known that more than 80% of the composition particles were originally small enough to pass a 400 mesh screen, as most of the particles were approximately 30 microns in diameter. Only a few of the particles were as large as 100 microns in diameter.

The composition was analyzed by x-ray diffraction and x-ray fluorescence spectroscopy to determine its chemical composition. X-ray diffraction revealed the presence of calcium magnesium aluminum silicate, calcium silicate, and two forms of calcium carbonate. X-ray fluorescence quantitative spectroscopy revealed the following composition:

| Oxides | Composition % (Dry Basis) |
| --- | --- |
| silicon dioxide ($SiO_2$) | 44.94 |
| aluminum oxide ($Al_2O_3$) | 9.46 |
| ferric oxide ($Fe_2O_3$) | 1.02 |
| calcium oxide (CaO) | 34.67 |
| magnesium oxide (MgO) | 3.57 |
| sulfur trioxide ($SO_3$) | 1.90 |
| sodium oxide ($Na_2O$) | 0.98 |
| potassium oxide ($K_2O$) | 1.80 |
| titanium dioxide ($TiO_2$) | 0.27 |
| phosphorus pentoxide ($P_2O_5$) | 0.17 |
| manganic oxide ($Mn_2O_3$) | 0.03 |
| loss on ignition | 1.08 |
| insolubles | 0.11 |
| | 100.00 |

The diffraction and spectroscopy test revealed that no tricalcium silicate was present and that only a small amount of dicalcium silicate was present. Significantly, dicalcium silicate and tricalcium silicate comprise between seventy and eighty percent of the composition of Portland Cement. The test results further reveal a higher than expected amount (for cement) of silicon oxide, aluminum oxide, potassium oxide, and magnesium oxide, and a lower than expected amount (for cement) of calcium oxide.

Preparation of the Improved Composite Material

The improved composition is mixed with water by techniques well known in the art to form the improved composite material. For example, water may be placed into a mixing chamber, and liquid additives may be blended with the water if desired. The composition is then slowly added to the water while the blender mixes the composition into the water. The composition is no longer added once the mix reaches the consistency of mastic or molasses. Next, small portions of water and composition are added until the desired amounts of water and composition are completely mixed with the water.

The improved composite material may be formed by mixing the cement and perlite fines to form a first composition, and then mixing water with the first composition. If aggregate, an inorganic binder, or other constituents are to be included in the composite material, they may be added to the first composition prior to mixing with water. Alternatively, the water may be added to the composition while the composition is being mixed.

The composition can be vibrated after water is added to facilitate the formation of the improved composite material. Preferably, a high frequency vibrator can be used for this purpose. In addition, the composition can be compressed after water is added to achieve a denser improved composite material, as is well known in the art.

It has been discovered that the improved composite material can be suitably formed by adding as little as 15 pounds, preferably 18 pounds, of water to 50 pounds of the improved composition. Preferably, a ratio of 18-20 pounds of water per 50 pounds of improved composition is believed to maximize the strength of the improved composite material. It is well known in the art that using excess water with cement will decrease the strength of the resulting concrete. It should be appreciated that more than 18-20 pounds of water per 50 pounds of composition may be used with a resulting loss in strength of the improved composite material. Where the weight of water is measured as a percentage of a composition that includes added aggregate or additive materials, 30 to as much as 60 weight percent water may be used.

Casting the Wet Improved Composite Material

Once the wet improved composite material has been mixed, it can be applied by spray, by trowel, or by casting. If the composite material is to be sprayed, a pump that is designed specifically for the purpose of spraying viscous cementitious material should preferably be used. For example, a Moyno type pump by Strong may be used. If structural steel is being sprayed, the steel may be wrapped with expanded metal lath and the composition may be sprayed on the metal lath. For example, the composition can be sprayed to a thickness of one-half to three-fourths inch.

The material is then allowed to set before a final coat or coats are applied. If corner beads are desired on structural steel, then a normal application would require a final troweling to create a smooth, flat surface. In addition, a trowel may be used to smooth the composition which is sprayed on expanded metal lath, and the composition is then finished according to the desired surface texture.

Figure 2:
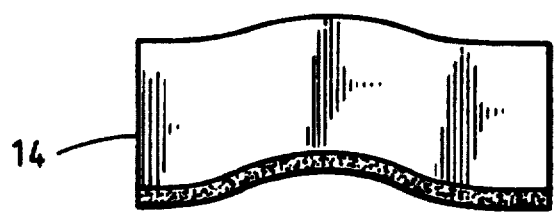
FIG. 2 illustrates a roof tile formed from the composition of the present invention.

The composition after mixing with water can be cast or troweled into many different shapes. FIG. 1 illustrates a panel 10 formed from the composition. FIG. 2 illustrates a shingle 14 formed from the composition. As illustrated, panel 10 can be cast with a design in the face of the panel 10. Typically, the composition is poured into a rectangular mold. The composite material also may be formed into tile.

In one embodiment of the invention, a reinforcing mat may be added to the wet improved composite material in the mold to strengthen the improved composite material. The wet improved composite material is poured into one-half of the mold, formed along the plane of the mold having the greatest cross-sectional area, and suitable reinforcing wire mesh or mat is positioned in the mold on top of the composition. Additional wet improved composite material is then poured to completely fill the mold. Preferably, the reinforcing mat should not touch any sides of the mold.

To form specific configurations of the panel or object being cast, the reinforcing mat should be formed to generally conform with the final configuration of the product through techniques well known in the art. The size of the mesh will vary according to the size of the panel. For example, medium sized prefabricated architectural panels may be as large as four by ten feet in size. In other applications, the architectural panels may be larger.

Architectural panels of this size may comprise any thickness depending on the desired use of the panel. In larger applications, the reinforcing wire mesh or reinforcing rods must be suitably sized, as is well known in the art, to provide rigidity and strength to the finished panel.

The thickness of a panel formed from the improved composite material of the invention may vary. For example, a panel which is between one and three inches thick and is two and one-half feet square will weigh between 15 and 50 pounds. The size and weight of the improved composite material products formed from the composition are not essential to the practice of the invention, but the composition permits lightweight panels to be fabricated which are easier to transport and install.

Analyses of Improved Composite Material

The improved composite material is not like known concrete or concrete derived materials. Analyses of the improved composite material have been unable to identify the presence of tricalcium silicate, which is a significant component of Portland cement. The improved composite material differs significantly from ordinary concrete because aggregate, such as gravel, is not necessary to form the material.

Ordinary concrete consists of a matrix of cement suspended in water that coats sand and aggregate particles. The cement undergoes a chemical transformation to bind the sand and aggregate into a hard composition.

The improved composite material formed from the composition does not require aggregate for its strength, although aggregate of differing types can be added to vary the physical properties of the product. In contrast, the composition uses perlite fines having small particle sizes that combines with the cement to form the dry mixed composition. This composition when mixed with water, and allowed to dry, achieves an extremely dense, tough, monolithic durable panel or plate which has ceramic-like qualities.

Tests of the improved composite material show a compression strength of 3350 psi, despite the lack of aggregate in the product. In contrast, lightweight vermiculite-added concretes have a compressive strength ranging from 700 to 900 psi. Ordinary concrete with aggregate has a compressive strength ranging from 2800–3000 psi.

Notably, the tensile strength for the improved composite material is 775 to 900 psi, which is significantly greater than the tensile strength of ordinary concrete (250–350 psi).

The improved composite material is beneficial in providing resistance to damage caused by fire. When the improved composite material reaches a certain temperature the cement will chemically release moisture that will cool the fire. The improved composite material is superior to concrete because it has a higher resistance to thermal shock than does concrete.

In tests where an ordinary concrete panel and an improved composite material panel were totally immersed in water for a period of 72 hours, placed into a freezer at 0° F. for 72 hours, and then immediately subjected to a torching type fire at 2250° F., the surface of the ordinary concrete panel spalled and cracked all the way through the panel.

In contrast, the improved composite material panel spalled slightly on the surface, with hairline cracks appearing over the surface during a torching type test, but did not crack. One explanation for the failure of the ordinary concrete panel is that the large amount of hard aggregate expands causing spalling and cracks in the panel. Notably, the improved composite material does not contain large amounts of aggregate.

Other tests have been performed to investigate the fire resistant properties of the improved composite material. A one and one-half inch panel was tested by ASTM E119 (UL 263) and it achieved a two and one-half hour fire rating. The maximum temperature at the completion of this test was 1900 degrees Fahrenheit.

In another fire resistance test a sample of the improved composite material was tested with the UL 1709 test which establishes the structural steel protection-factor provided by a material for resistance to rapid temperature-rise fires. This test measures the amount of time needed for the average temperature of a steel column insulated with the material being tested to exceed 1000° F., or the amount of time needed for a single temperature of the steel column to exceed 1200° F. A sample of the improved composite material reached the limiting average temperature at 131 minutes. This corresponds to a two hour listing by UL.

Advantages of the Improved Composite Material

Products manufactured from the improved composite material may be easily duplicated in remote locations that are distant from manufacturing facilities. The composition does not use local aggregates and sand for the finished product, and this avoids deviations in the quality of the product that are due to variations in raw materials and the moisture content of the raw materials. The composition is lightweight and can be easily transported to remote locations, thus assuring the quality and consistency of the improved composite material.

The compressive strength of the improved composite material is comparable to ordinary concrete, while the flexural strength of the material is substantially higher than ordinary concrete. Accordingly, the composition can be cast in thinner panels, that are stronger and weigh less than similar panels cast from concrete. For example, an improved composite material panel ranges from 20 to 65 percent of the weight of an ordinary concrete panel of the same size.

The composition after mixing with water may be cast into many different forms and shapes. For example, the composition can be cast into construction components such as architectural and fascia panels, roof tiles, retaining walls, and other useful shapes. Since the composition is unaffected by water, the composition can be used in bulkheads or retaining walls subjected to or immersed in water. Moreover, the composition can be cast into structural, load-bearing components. The composition may also be cast into fireproof or sound-proof panels.

In another application, the composition can be made into a foam by entraining a large amount of air into the composition and by other well known processes. The foam resists water absorption and damage due to fire and can be cast into panels and other shapes or can be sprayed on objects through techniques which are well known in the art.

Depending on the shape and desired use of the improved composite material, various fastening means may be bonded to it or may be cast into it to aid in installing it or building with it. One unique advantage of the improved composite material is that nails, screws, and other fastening devices are easily fastened into panels or other shapes formed from the improved composite material. In addition, the fastening devices can easily be removed, which furnishes a unique advantage over concrete products.

The invention provides a composition which can be formed into an improved composite material that is lighter, stronger, and of a more consistent quality than are products formed from known cement compositions.

The improved composition, improved composite material, and method described above are merely illustrative of the present invention. Many other variations of the composition, composite material, and method may be made, and other modifications to the composition, composite material, and method may be made without departing from the scope of this invention. It is understood that the details shown herein are to be interpreted as explanatory and not in a limiting sense.

EXAMPLE 1

Two cups of perlite powder were mixed with one cup of Portland No. I cement in a container by using a paint mixer attachment attached to an electric drill. These materials were mixed for several minutes to form a dry, uniformly-mixed composition.

12 ounces of water were gradually added to the composition and mixed in with the electric drill paint mixer. The consistency of the material after the water was added was like mastic or molasses.

The material was next molded into a six inch by nine inch panel that was approximately one inch thick. The panel was allowed to dry for 24 hours.

The resulting panel of improved composite material had a density of 80 pounds per cubic foot. The compressive strength and Shore D hardness of the panel were 3350 psi and 75-80, respectively.

EXAMPLE 2

A panel of the improved composite material was prepared by the procedure of Example 1 using one cup of perlite powder, one cup of Portland No. I cement, and eight ounces of water. The resulting panel of improved composite material had a compressive strength ranging from 1480 to 2040 psi and a Shore D hardness of 80.

EXAMPLE 3

A panel of the improved composite material was prepared by the procedure of Example 1 using one cup of perlite powder, 3 cups of Portland No. I cement, and 17 ounces of water. The resulting panel of improved composite materials had a compressive strength ranging from 590 to 630 psi and a Shore D hardness of 47.

EXAMPLES 4-14

Tests were conducted to determine if other materials with small particle sizes could be used instead of perlite fines to form an improved composite material. Each material used consisted primarily of particles smaller than 400 mesh. In each test 2 cups of the material were mixed with one cup of Portland No. I cement. The results of these tests were:

| Material | Water Used (oz.) | Compression Strength (psi) | Shore D Hardness |
|---|---|---|---|
| Fly Ash | 8 | 2670-2750 | 90 |
| Calcium Carbonate | 9 | 2190-2310 | 84 |
| Clay | 9 | 1570-2060 | 75 |
| Red Iron Oxide | 10 | 2140-2260 | 79 |
| Talc | 10.5 | 1570-1620 | 64 |
| Carbon Black | 9 | 1170-1240 | 75 |
| Cab-O-Sil | 12 | 580-660 | 64 |
| Corn Starch | 14.5 | 390-450 | 47 |
| Flour | Did not set up | | |
| Powdered Sugar | Did not set up | | |

What is claimed:

1. An improved composition, the composition comprising:
   a) cement in the range of 30-85 percent by weight; and
   b) perlite fines in the range of 15-70 percent by weight, the perlite fines consisting of particles less than 200 mesh in size.

2. An improved composition as recited in claim 1, where at least 60 percent by weight of the perlite fines consist of particles less than 300 mesh in size.

3. An improved composition as recited in claim 1, where the perlite fines consist primarily of particles less than 400 mesh in size.

4. An improved composition as recited in claim 1, the composition further comprising inorganic filler in the range of 5-25 parts per 100 parts by weight of the cement and perlite fines.

5. An improved composition as recited in claim 1, where the perlite fines retain at least 3 percent water by weight.

6. An improved composition as recited in claim 1, the composition further comprising water in the range of 30-40 parts per 100 parts by weight of cement and perlite fines.

7. An improved composition, the composition comprising:
   a) cement in the range of 25-70 percent by weight;
   b) inorganic filler in the range of 5-10 percent by weight;
   c) perlite fines in the range of 8-15 percent by weight, the perlite fines consisting of particles less than 200 mesh in size; and
   d) water in the range of 30-60 parts per 100 parts by weight of cement, inorganic filler and perlite fines.

8. An improved composition as recited in claim 7, wherein the inorganic filler comprises inorganic fly ash.

9. An improved composition as recited in claim 7, wherein the composition comprises water in the range of 30-40 parts per 100 parts by weight of cement, inorganic filler, and perlite fines.

10. An improved composition as recited in claim 4, the composition further comprising aggregate in the range of 4-8 parts per 100 parts by weight of cement, perlite fines, and inorganic filler.

11. An improved composition as recited in claim 4, the composition further comprising glass fibers in the amount of about 2 parts per 100 parts by weight of cement, perlite fines, and inorganic filler.

12. An improved composition as recited in claim 4, the composition further comprising a plasticizer in the amount of about 7 parts per 100 parts by weight of cement, perlite fines, and inorganic filler.

13. An improved composition as recited in claim 4, the composition further comprising an air entrainer in the amount of about 3 parts per 100 parts by weight of cement, perlite fines, and inorganic filler.

14. An improved composite material, the material comprising:
   a) cement in the range of 25-70 percent by weight;
   b) perlite powder in the range of 8-15 percent by weight, the perlite powder consisting primarily of particles less than 400 mesh in size; and
   c) water in the range of 30-40 percent by weight.

15. An improved composite material as recited in claim 14, the material further comprising perlite fines in the range of 5-25 parts per 100 parts by weight of cement, perlite powder, and water, the perlite fines consisting of particles less than 200 mesh in size.

16. An improved composite material, the material comprising:
   a) cement in the range of 25-70 percent by weight;
   b) perlite fines in the range of 10-60 percent by weight, the perlite fines consisting of particles less than 200 mesh in size;
   c) inorganic fly ash in the range of 10-16 percent by weight; and
   d) aggregate in the range of 4-8 percent by weight.

17. An improved composite material as recited in claim 16, the composite material further comprising reinforcing material for strengthening the composite material.

18. An improved composite material as recited in claim 17, where the reinforcing material comprises glass fibers.

19. An improved composite material as recited in claim 16, the composite material further comprising plasticizer in the range of 0.2-0.7 parts per 100 parts by weight of cement, perlite fines, inorganic fly ash, and aggregate.

20. An improved composite material as recited in claim 16, the material further comprising air entrainer in the range of 0.1-3 parts per 100 parts by weight of cement, perlite fines, inorganic fly ash, and aggregate.

21. A panel formed from an improved composite material, the composite material comprising:
   a) cement in the range of 30-85 percent by weight; and
   b) perlite fines in the range 15-70 percent by weight, the perlite fines consisting of particles less than 200 mesh in size.

22. A panel as recited in claim 21, the panel further comprising inorganic filler in the range of 5-25 parts per 100 parts by weight of cement and perlite fines.

23. A tile formed from an improved composite material, the composite material comprising:
   a) cement in the range 30-85 percent by weight; and
   b) perlite powder in the range 15-70 percent by weight, the perlite powder consisting primarily of particles less than 400 mesh in size.

24. A tile as recited in claim 23, the tile further comprising inorganic filler in the range of 5-25 parts per 100 parts by weight of cement and perlite powder.

25. An improved composition, the composition comprising:
   a) cement in the range of 33 to 75 percent by volume;
   b) perlite fines in the range of 25 to 67 percent by volume, the perlite fines consisting of particles less than 200 mesh in size.

26. An improved composition as recited in claim 25, where the perlite fines consist primarily of particles less than 400 mesh in size.

27. An improved composition, the composition comprising:
   a) about 33 percent by volume of cement;
   b) about 67 percent by volume of perlite fines, the perlite fines consisting of particles less than 200 mesh in size.

28. An improved composite material, the material comprising:
   a) cement in the range of 33 to 75 percent by volume;
   b) perlite fines in the range of 25 to 67 percent by volume, the perlite fines consisting of particles less than 200 mesh in size; and
   c) an effective amount of water to hydrate the mixture of cement and perlite fines.

29. An improved composite material as recited in claim 28, where the perlite fines consist primarily of particles less than 400 mesh in size.

30. An improved composite material as recited in claim 28, where the cement comprises about 33 percent by volume and the perlite fines comprise about 67 percent by volume.

* * * * *

UNITED STATES PATENT AND TRADEMARK OFFICE
CERTIFICATE OF CORRECTION

PATENT NO. : 5,080,022
DATED : January 14, 1992
INVENTOR(S) : James P. Carlson

It is certified that error appears in the above-indentified patent and that said Letters Patent is hereby corrected as shown below:

Col. 4, line 35, delete "7 percent" and insert --0.7 percent--.
Col. 4, line 63, after "weight" insert --,--.

Signed and Sealed this

Fourteenth Day of March, 1995

Attest:

BRUCE LEHMAN

Attesting Officer     Commissioner of Patents and Trademarks